(12) United States Patent
Kuschlan

(10) Patent No.: US 10,571,083 B2
(45) Date of Patent: Feb. 25, 2020

(54) MODULAR PORTABLE DEVICE FOR VIEWING, SIGNALLING AND/OR LIGHTING

(71) Applicant: VIVEVIT S.R.L. SEMPLIFICATA A SOCIO UNICO, Peschiera Borromeo, Milan (IT)

(72) Inventor: Federico Kuschlan, Milan (IT)

(73) Assignee: VIVEVIT S.R.L. SEMPLIFICATA A SOCIO UNICO, Peschiera Borromeo, Milan (IT)

( * ) Notice: Subject to any disclaimer, the term of this patent is extended or adjusted under 35 U.S.C. 154(b) by 0 days.

(21) Appl. No.: 16/087,588

(22) PCT Filed: Mar. 25, 2016

(86) PCT No.: PCT/IT2016/000077
§ 371 (c)(1),
(2) Date: Sep. 21, 2018

(87) PCT Pub. No.: WO2017/163270
PCT Pub. Date: Sep. 28, 2017

(65) Prior Publication Data
US 2019/0101251 A1    Apr. 4, 2019

(51) Int. Cl.
*F21L 4/04*      (2006.01)
*B62J 29/00*     (2006.01)
(Continued)

(52) U.S. Cl.
CPC . *F21L 4/04* (2013.01); *B62J 6/00* (2013.01); *B62J 6/001* (2013.01); *B62J 29/00* (2013.01);
(Continued)

(58) Field of Classification Search
CPC ................ B62J 6/00; B62J 6/005; F21L 4/04
(Continued)

(56) References Cited

U.S. PATENT DOCUMENTS 4,970,630 A * 11/1990 Mudrovich ................ B62J 6/00
                                                    362/184
5,921,669 A *  7/1999 Taylor ....................... B62J 6/00
                                                    362/191
(Continued)

FOREIGN PATENT DOCUMENTS

| CN | 203 902 735 U | 10/2014 |
| CN | 104 369 799 A | 2/2015 |
| GB | 2 528 844 A | 2/2016 |

OTHER PUBLICATIONS

International Search Report and Written Opinion of the International Searching Authority for International Patent Application No. PCT/IT2016/000077 dated Aug. 22, 2016, 14 pages.

*Primary Examiner* — Julie A Bannan
(74) *Attorney, Agent, or Firm* — Merchant & Gould P.C.

(57) ABSTRACT

A modular portable device (4) for viewing, signaling and/or lighting includes a casing (8) suitable for realizing both a container body and a grip or attachment element of the modular portable device (4). At least one viewing device (12) is suitable to reflect an image of the surrounding environment to the modular portable device (4). At least one signaling device (20) emits a beam of light to signal the presence of the modular portable device and/or the user or vehicle supporting the modular portable device (4). The viewing and signaling devices (12, 20) are mechanically separable from one another and mechanically associable and removable to/from the casing (8) independently of each other.

19 Claims, 6 Drawing Sheets

(51) Int. Cl.
*F21V 33/00* (2006.01)
*B62J 6/00* (2020.01)
*F21Y 115/10* (2016.01)
*F21W 107/13* (2018.01)
*G08B 5/00* (2006.01)

(52) U.S. Cl.
CPC ....... *F21V 33/008* (2013.01); *F21W 2107/13* (2018.01); *F21Y 2115/10* (2016.08); *G08B 5/00* (2013.01)

(58) Field of Classification Search
USPC ........................................................ 362/474
See application file for complete search history.

(56) References Cited

U.S. PATENT DOCUMENTS

| | | | | |
|---|---|---|---|---|
| 6,067,998 | A * | 5/2000 | Favre | A45D 33/008 |
| | | | | 132/301 |
| 6,805,473 | B2 * | 10/2004 | Beard | B62J 6/005 |
| | | | | 340/468 |
| 8,038,332 | B2 * | 10/2011 | Lin | B60Q 1/2665 |
| | | | | 362/494 |
| 2004/0194571 | A1 * | 10/2004 | Zagrodnik | B62J 6/005 |
| | | | | 74/551.8 |
| 2011/0051442 | A1 | 3/2011 | Chang | |
| 2011/0235310 | A1 | 9/2011 | Chen | |
| 2014/0300981 | A1 | 10/2014 | Crane | |

* cited by examiner

US 10,571,083 B2

MODULAR PORTABLE DEVICE FOR VIEWING, SIGNALLING AND/OR LIGHTING

This application is a National Stage Application of PCT/IT2016/000077, filed 25 Mar. 2016, and which application is incorporated herein by reference. To the extent appropriate, a claim of priority is made to the above-disclosed application.

FIELD OF APPLICATION

The present invention relates to a modular portable device for viewing, signalling and/or lighting. Such a device can for example be held manually by a user, fixed to an arm, and can also be fixed to a means of transport, such as the handlebar of a bicycle.

STATE OF THE ART

As is known, in the art there are devices suitable for viewing, such as rear-view mirrors of various shapes and sizes, as well as devices suitable to light the environment, by emitting a light beam and/or signalling the position of an individual for signalling purposes, both by emitting a light beam in an active manner, and by reflects light beams incident thereon in a passive manner, for example by means of reflectors.

The solutions of the prior art have several drawbacks.

First of all, there are no devices that, taken singly, are able to effectively satisfy a user who wishes to use the same alternately, in the three functions mentioned of viewing, signalling and/or lighting, for example when cycling and/or running and/or walking outdoors and/or lastly for domestic use. Moreover the known devices are often fixed and bulky and therefore poorly suited for portable use, for example to be held or attached to a user's limb, or for use on a means of transport such as a bicycle. Moreover the known devices are often made by providing for a simultaneous fixed presence of the viewing devices with the signalling and/or lighting devices: the latter, as is known, exert their function in the absence of sunlight and hence their exposure during use of the device in daylight hours makes them unnecessarily exposed to risks such as impacts and atmospheric agents. Furthermore in the known devices, where several sources of signalling and/or lighting are provided, these are oriented along the same directrix; in other words, in the known solutions it is not possible to orient the possible sources of signalling and/or lighting according to directrices incident or at an angle to each other or in any case not parallel.

Finally, the known devices in relation to their phase of non-use are often lacking in terms of protection of the entire apparatus or of the most delicate parts thereof from impact and/or damage.

PRESENTATION OF THE INVENTION

The purpose of the present invention is to make a device which overcome the drawbacks mentioned with reference to the prior art.

In other words, the purpose is to provide a portable device, practical and easy to handle, which can both in use on a person (for example held manually or on an arm, etc.) and in use on a means of transport, ensure the viewing, signalling and/or lighting functions, both individually and simultaneously to each other. The device to be realised also sets out to be characterized by the attention to the protection of the same in a condition of non-use.

DESCRIPTION OF THE DRAWINGS

Further characteristics and advantages of the present invention will be more clearly comprehensible from the description given below of a preferred and non-limiting example of embodiment, wherein.

DETAILED DESCRIPTION

Figure 1:
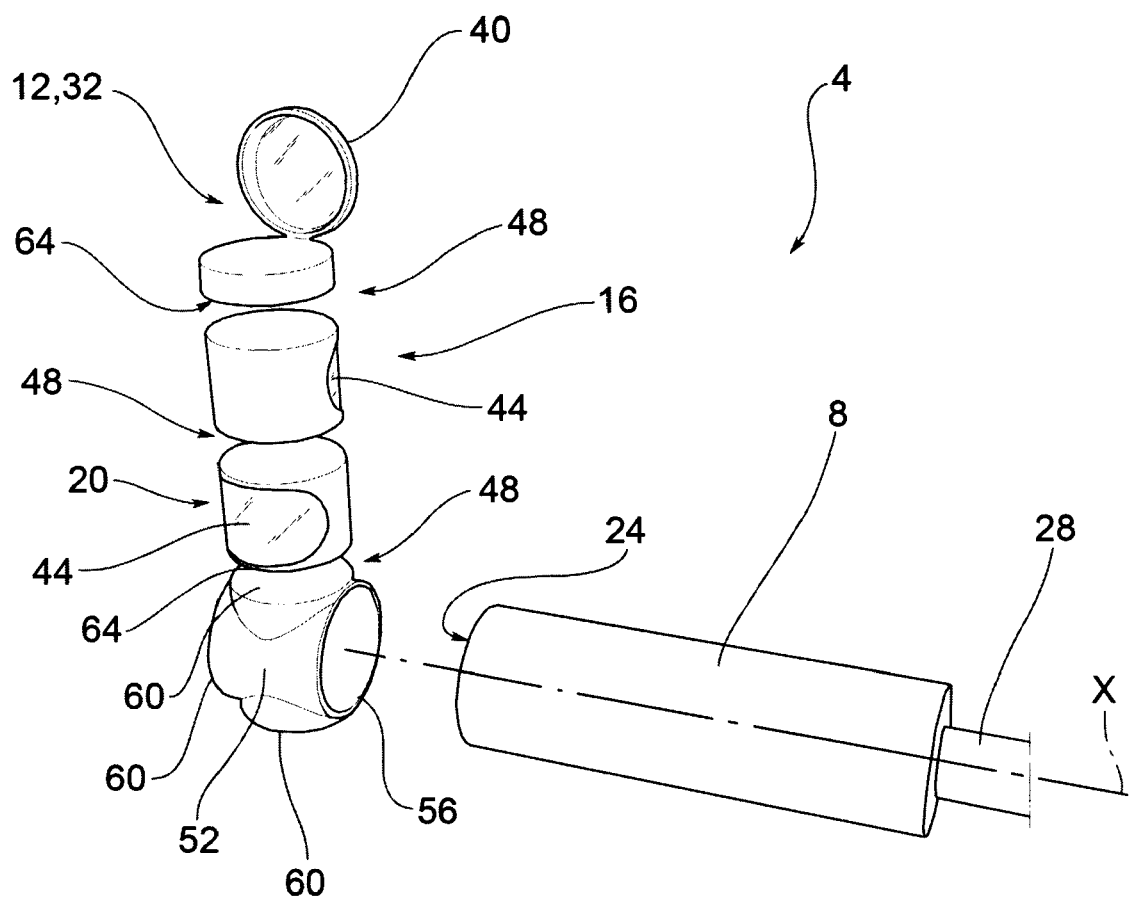
FIG. 1 shows a perspective view, in a configuration of separate parts, of a modular portable device according to a first embodiment of the present invention.
Figure 2:
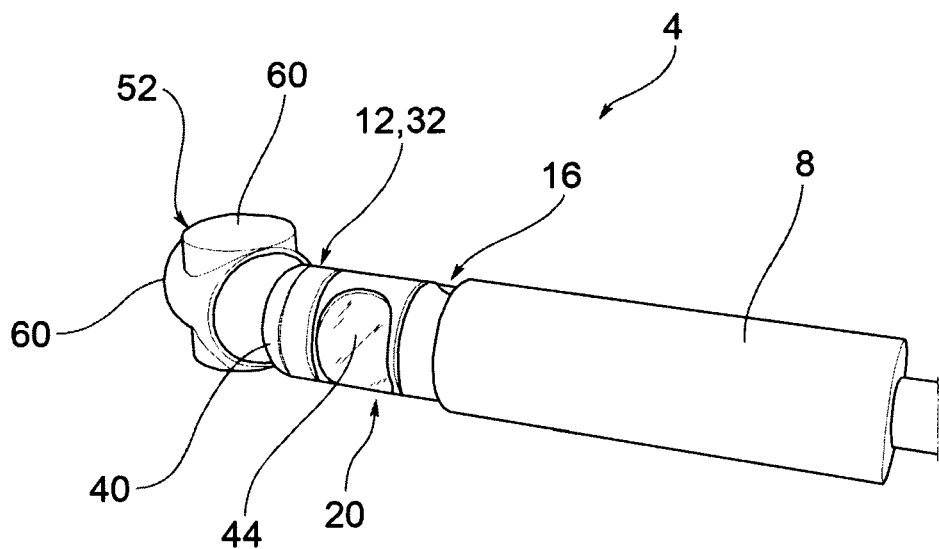
FIG. 2 shows a perspective view, in a configuration of separate parts, of a modular portable device according to a second embodiment of the present invention.
Figure 3:
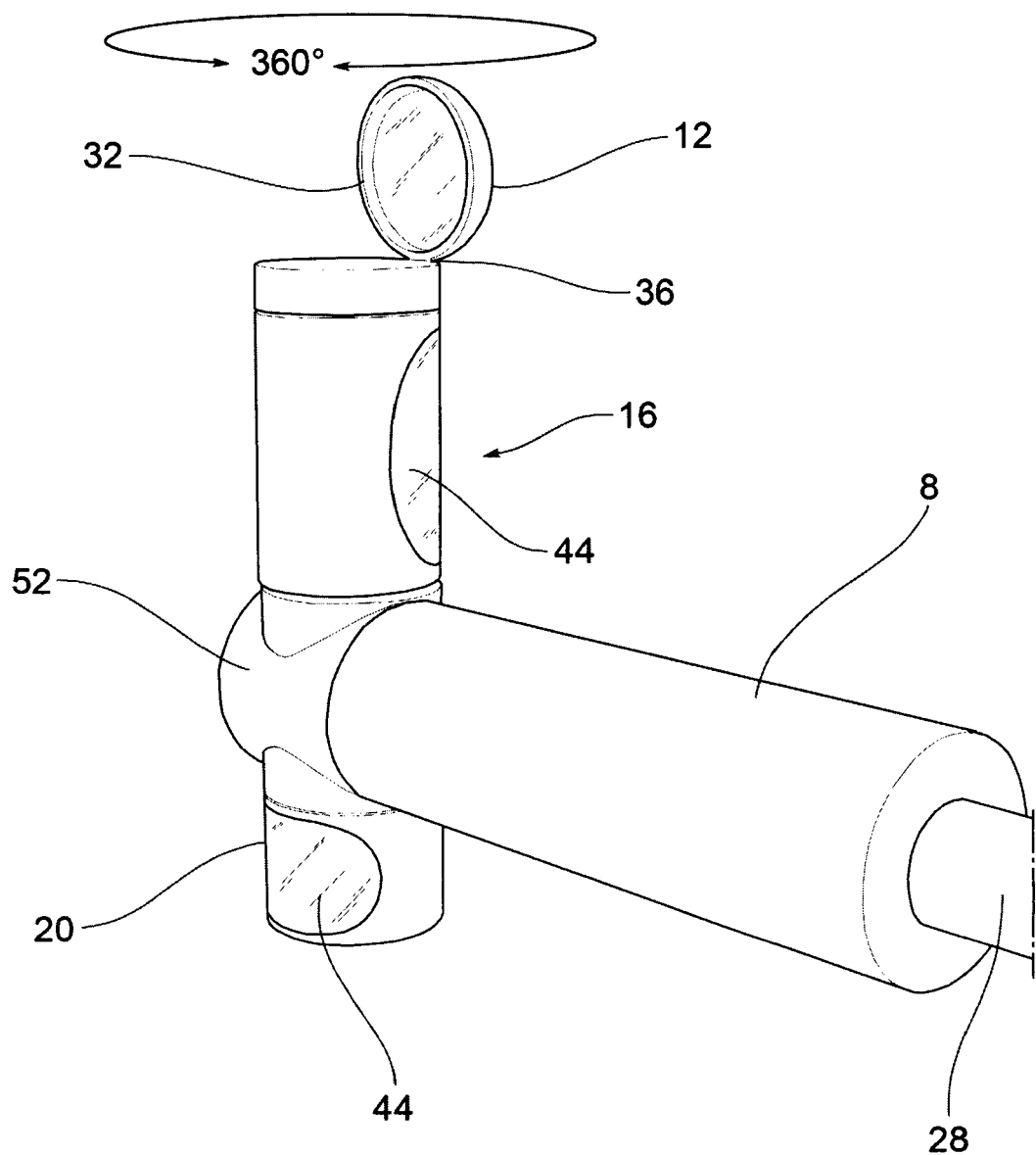
FIGS. 3-7 are perspective views, in an assembled configuration on the handlebar of a bicycle, of modular portable devices, configured according to different arrangements.
Figure 4:
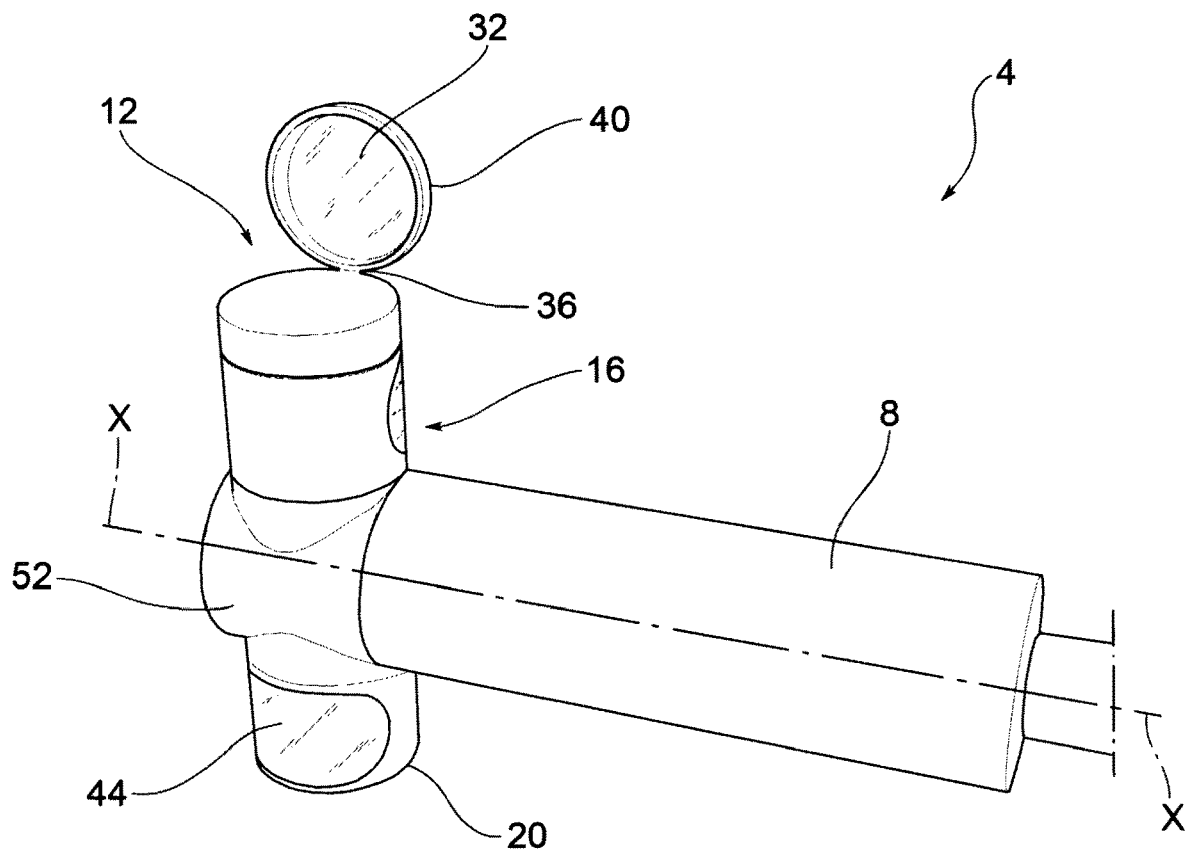
Figure 5:
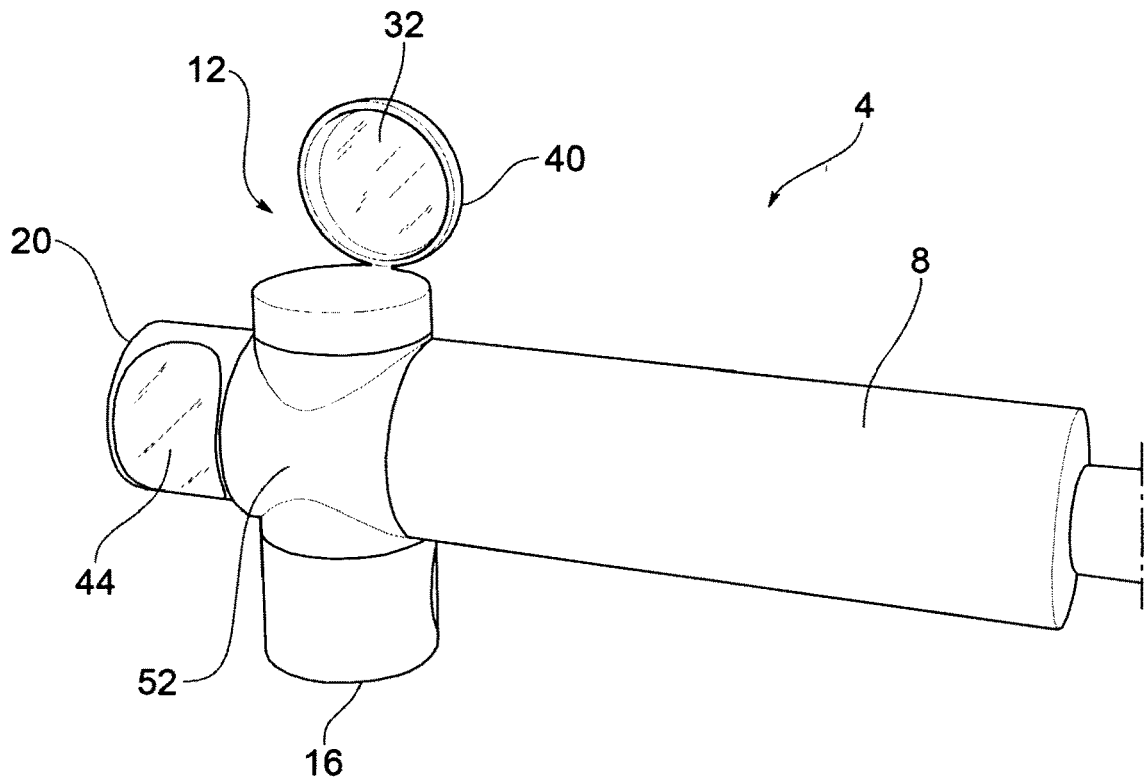
Figure 6:
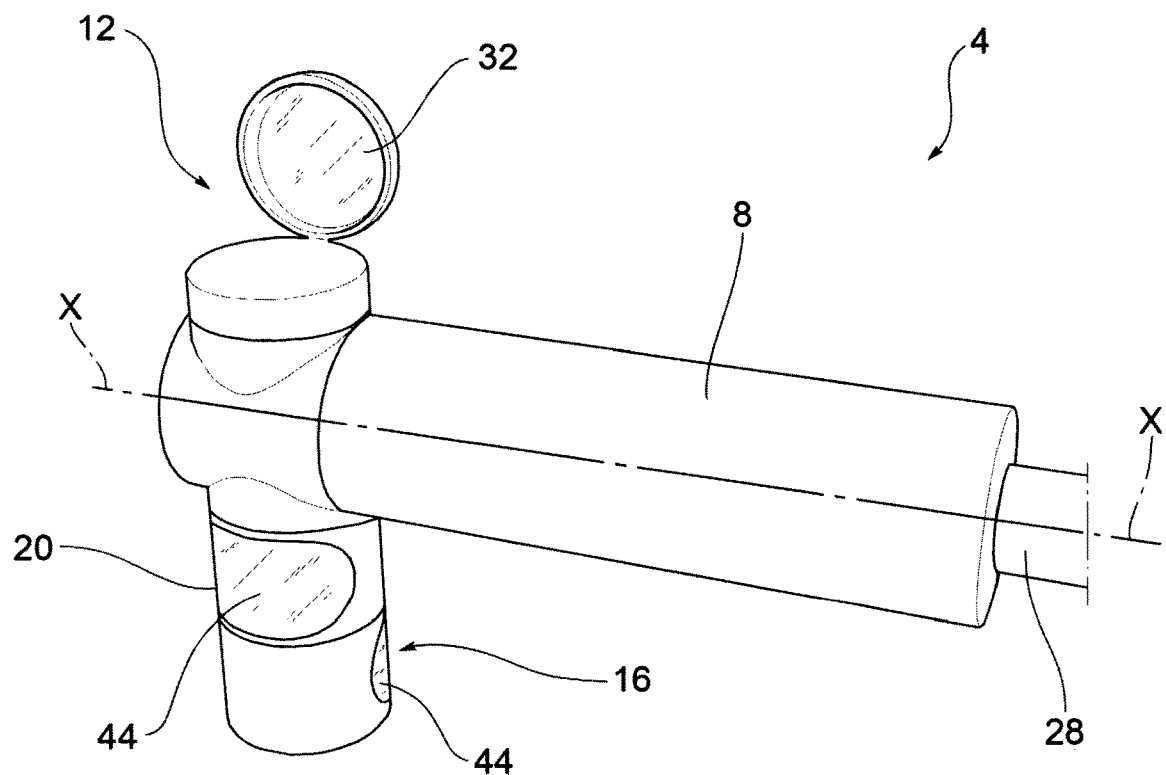
Figure 7:
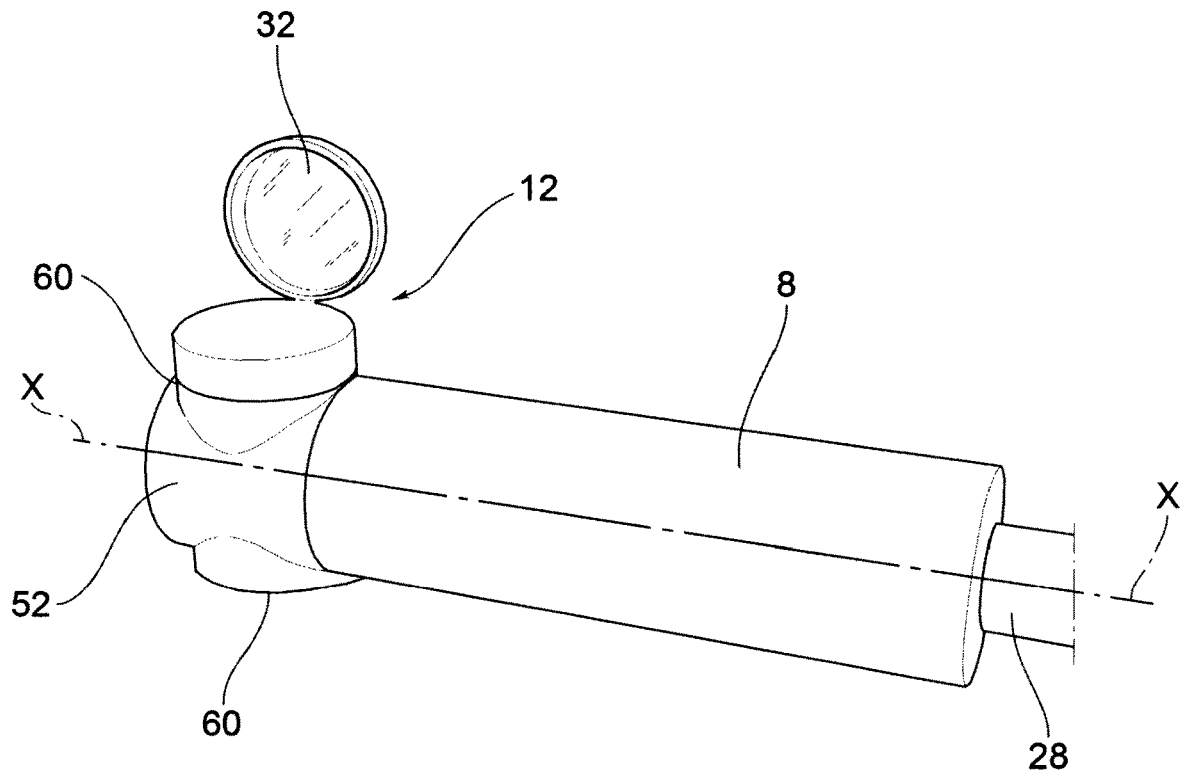
Figure 8:
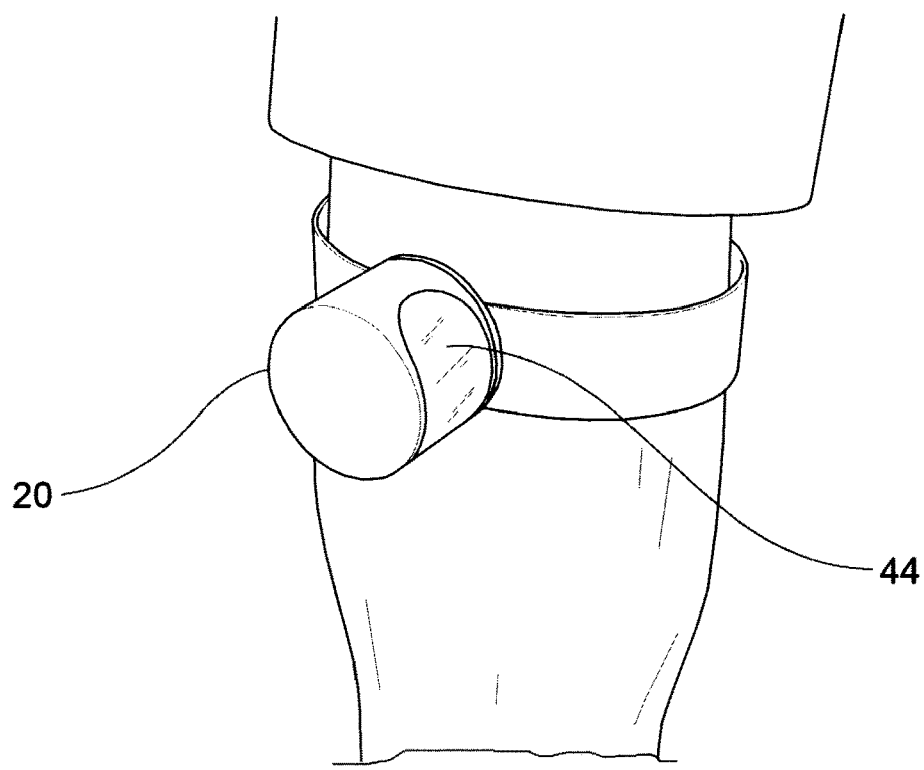
FIGS. 8-11 are perspective views of portable use, by a user in movement running or walking, of modular portable devices according to the present invention.
Figure 9:
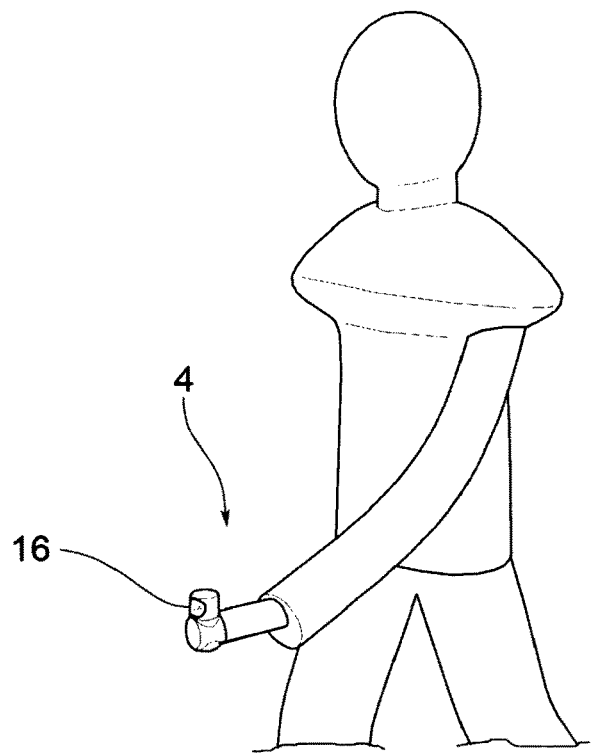
Figure 10:
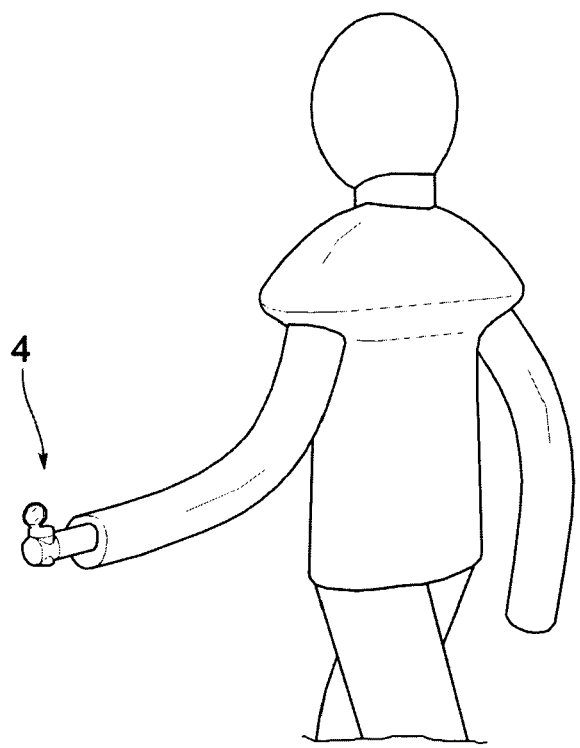
Figure 11:
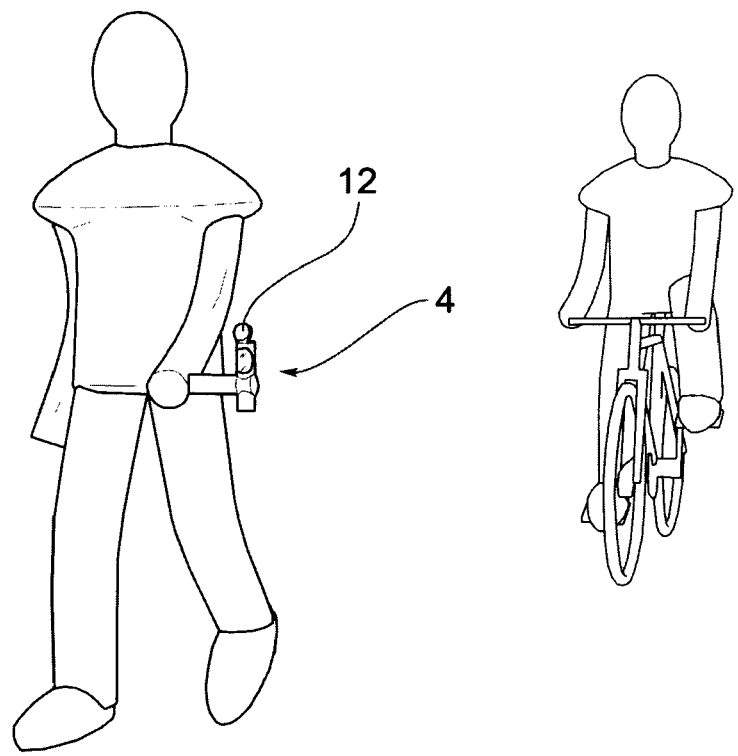

With reference to the aforementioned figures, reference numeral 4 globally denotes a modular portable device for viewing, signalling and/or lighting.

The portable modular device 4 comprises a casing 8 suitable for realizing both a container body and a grip or attachment element of the modular portable device 4. A grip element is understood to mean an element suitable to be comfortably grasped, i.e. held by a user, according to ergonomic criteria. Such grip must therefore be convenient, ergonomic, and practical for the user.

The casing 8 is suitable to contain and/or support at least one viewing device 12, at least one signalling device 20 and/or at least one lighting device 16, described further below. As is well known, the expression 'at least one' means that it is possible to use one, but also two or more devices of each type, thanks to the fact that said devices 12,16,20 are mechanically separable from one another and mechanically associable to each other and to the casing 8, as better described below.

According to one embodiment, the casing 8 is a hollow body which delimits a cavity 24 at least partially counter-shaped relative to said viewing 12, signalling 20 and/or lighting elements 16, which are at least partially housed inside the cavity 24 of said casing, when not in use.

According to one embodiment, the cavity 24 of the casing 8 has a cylindrical conformation with respect to a main extension axis X-X.

Preferably, the casing 8 is in turn a cylindrical body with respect to a main extension axis X-X.

The cylindrical conformation of the casing is particularly ergonomic and suitable to permit easy gripping/holding by a user.

In addition, the cavity 24 of the casing 8 may be used for an easy attachment of the same to a support. For example such a cavity 24, if cylindrical, may be inserted around one end 28 of a handlebar of a bicycle. Obviously other configurations for attachment to the handlebar of a bicycle are possible; these types are to be considered all included within the scope of protection of the present invention.

Preferably, the casing 8 is made of rubber and may provide for non-slip means for a firm grip by a user. As an alternative to rubber a plastic material may for example be provided for. Obviously it is also possible to use different materials from rubber and plastic for the realization of the casing 8.

The viewing device 12 is suitable to reflect an image of the surrounding environment to the modular portable device 4.

For example, the viewing device 12 comprises a mirror 32, so as to allow the user to see behind him, either by manually holding the modular portable device 4, or attaching said modular portable device 4 to the handlebar of a bicycle. The mirror 32 thus acts as a rear-view mirror.

According to one embodiment, the mirror 32 comprises a rotation joint 36 to allow the orientation of the mirror 32 at will; preferably said rotation joint 36 is a ball joint, therefore able to allow the rotation of the mirror 32 both in a lateral direction, i.e. right/left, and in a vertical direction, i.e. up/down.

Preferably, the viewing 12, signalling 20 and/or lighting devices 16 are provided with rotation joints 36 suitable to allow the rotation of said viewing 12, signalling 20 and/or lighting devices 16 at least in the lateral direction, that is, right/left, and preferably also in the vertical direction, i.e. up/down. Thanks to the presence of several joints independent of each other, it is possible to orient the respective light beams in different directions to each other, as required by the user. Said rotation joints 36 may for example be integrated in the respective removable attachment means of the viewing 12, signalling 20 and/or lighting devices.

According to one embodiment, the viewing device 12 comprises a lid 40 folding back on said mirror 32. The cover 40 has the purpose of protecting the mirror when not in use.

The lighting device 16 is suitable to emit a light beam to illuminate a surrounding environment. The lighting device 16 can be used as a torch or a headlight by a user both manually and in the application on the handlebar of a bicycle.

For example, the lighting device 16 comprises at least one lamp 44. For the purposes of the present invention the type of lamp 44 is irrelevant. An energy-efficient lamp, such as a LED lamp, is clearly preferred given the need for reduced dimensions and long autonomy of operation as well as power of the light beam emitted in respect of said small dimensions.

The signalling device 20 is suitable to emit a beam of light to signal the presence of the modular portable device 4 and/or of the user or vehicle supporting said modular portable device 4.

It is therefore essentially a presence-signalling device; this signal can for example take place by means of at least one reflector, in a passive manner, and/or a lamp 44, in an active manner. In other words, the signalling device 20 can passively reflect a light beam incident on it, acting as a reflector, and/or can actively emit a light beam to signal the presence of said device, and of the user/vehicle carrying it.

The modular portable device 4 may provide for the use of reflectors generally arranged both on the casing 8 and on parts of the viewing 12, signalling 20 and lighting devices 16.

Also in the case of the signalling device 20, for the purposes of the present invention, the type of lamp 44 used is irrelevant. An energy-efficient lamp, such as an LED lamp, is clearly preferred given the need for reduced dimensions and long autonomy of operation as well as power of the light beam emitted in respect of said small dimensions.

Preferably, the lamps 44 of the lighting device 16 differ from those of the signalling device 20 in the power of the beams of light emitted; as regards the colours, preferably, the lighting device 16 is characterised by the emission of white light, while the signalling device 20 provides the dual possibility of emitting a beam of white light or red light.

According to one embodiment, the signalling device 20 and/or the lighting device 16 comprise power supply means (not shown) contained inside said devices to power the respective lamps 44. For example, said power supply means are battery power supply means; alternatively further power supply means can be used such as electric power supplies with USB type connections and the like. For example, it is possible to connect the portable device 4 to an electric power source, be it a wall socket or a USB socket to recharge the individual signalling 20 and/or lighting devices 16 even when they are in the retracted or position of non-use inside the casing. Obviously the portable device 4 will be provided with power sockets, electric or of the USB type, suitably arranged so as to be easily accessible by the user to permit the electrical connection thereof.

Advantageously, said viewing 12, signalling 20 and/or lighting devices 16 are mechanically separable from one another and mechanically associable and removable to/from said casing 8 independently of each other. Consequently such devices can be used jointly or separately from each other according to the user's contingent requirements.

In this sense the device 4 is modular, since the individual devices 12, 16, 20 do not have fixed positions relative to the casing 8 but can be connected and disconnected from the casing and repositioned in different positions of said casing.

As already mentioned, the modular portable device 4 may comprise at least one viewing device 12, at least one signalling device 20 and at least one lighting device 16. Consequently, said modular portable device 4 may comprise a plurality of each of said viewing 12, signalling 20 and lighting devices 16 independently and detachably associated with each other and/or with respect to the casing 8.

Preferably, the viewing 12, signalling 20 and lighting devices 16 comprise removable attachment means 48 of the devices 12, 16, 20 to the casing 8 compatible with each other, so that the devices 12, 16, 20 are interchangeable with each other.

According to one embodiment, the modular portable device 4 comprises a multiple connector 52 having an attachment element to the casing 56 and a plurality of coupling elements 60 for said viewing 12, signalling 20 and lighting devices 16, wherein said attachment elements 60 detachably support the viewing 12, signalling 20 and lighting devices 16.

Said attachment elements 60 are shaped so as to couple with the removable attachment means 48 of the devices 12, 16, 20.

According to one embodiment, the attachment element to the casing 56 of the multiple connector 52 has a cylindrical geometry around said axis main extension axis X-X. This way it is possible to rotate the multiple connector 52 around the axis X-X, keeping the multiple connector 52 attached to said casing.

According to one embodiment, the attachment elements of the multiple connector 52 comprise cylindrical geometry protuberances suitable to provide a detachable mechanical coupling with relative counter-shaped seats 64 of the removable attachment means 48 of said viewing 12, signalling 20 and lighting devices 16.

For example, the coupling elements are shaped so as to form a shaped coupling with the removable attachment means 48 of the viewing 12, signalling 20 and lighting devices 16.

According to a possible embodiment, the coupling elements comprise magnetic connection means which form a mechanical coupling with the removable attachment means 48 of the viewing 12, signalling 20 and lighting devices 16.

According to a possible embodiment, the multiple connector 52 comprises power supply means, for example a battery, contained inside said multiple connector; furthermore, the multiple connector 52 comprises at least one electrical output terminal suitable to couple with a corresponding electrical input terminal attached to at least one out of the signalling means 20 and the lighting means 16 so as to permit the power supply thereof. This way it is possible to use a single power supply medium, such as a single battery, contained inside the multiple connector, which as needed can power all the devices connected thereto.

The functioning and method of use of a modular portable device according to the present invention will now be described.

In particular, as seen, the device can be configured in various configurations, depending on the number and type of viewing, signalling and/or lighting devices to be used.

The user can thus start from a configuration of non-use or transport in which all the viewing, signalling and lighting devices are placed and contained inside the casing: such a configuration is useful, for example for the transport of the various devices which are all collected in the casing so as not to be subjected to risks of impact.

Then, as needed, the user can decide whether to hold the modular portable device 4 or attach it to a limb, e.g. an arm or a leg, or fix it for example to the handlebar of a bicycle.

Of course, the user can decide when and which devices to extract from the casing 8 and attach to said casing 8 depending on the use to be made of the modular portable device 4. He may therefore extract the devices individually or all together, as well as change the relative position of each of the extracted devices with respect to the casing 8, as preferred, as per the appended explanatory figures.

As may be appreciated from the description, the device of the present invention makes it possible to overcome the drawbacks mentioned of the prior art.

In particular, the device according to the invention is of the portable type and can be easily held by a user or fixed for example to a handlebar of a bicycle. The device is therefore light and manageable and can also be fixed, for example using single devices, to a limb of a user, for example to an arm or a leg.

Furthermore, the device is of the modular type, i.e. comprises a plurality of devices, independent of each other, such as for example viewing, signalling and lighting devices which may be composed in the configuration preferred by the user according to the user's needs in terms of both size/dimensions, number of pieces of the individual devices, and in terms of functionality.

For example the user may decide to compose the modular portable device in order to have sufficient devices to perform the three functions simultaneously, or so as to have two or even only one component and thus a single function or again in order to have the same function performed by several components of a single device.

In addition, the user can decide to compose the various viewing, signalling and lighting devices according to a preferred spatial pattern depending on his needs and convenience.

In addition, the user can choose to buy and assemble in subsequent stages the various viewing, signalling and lighting devices, performing all the customizations desired.

In addition, the user can orient the sources of signalling and/or lighting according to directrices incident or at an angle with each other, or in any case not necessarily parallel to each other, as needed.

Furthermore, the modular portable device comprises a casing which serves as both a support for the various viewing, signalling and lighting devices and as a grip for the said device or for fastening on the handlebar of means of transport such as a bicycle.

In addition, the casing also acts as a container for one or more elements when not in use. For example, it is possible to mount the signalling and lighting devices in an operating position and store the viewing device inside the casing, in the inoperative or rest position. Obviously all combinations which provide for storing the various devices in the rest position or in the operating position are possible independently of each other. It is also possible to place all the devices inside the casing, so as not to have loose parts, and risk losing one or more elements of the device. The possibility of storing one or more devices inside the casing is a definite advantage since it prevents the user from forgetting/losing the individual components of the modular mobile device and from damaging them.

The user can thus carry with him all the viewing, signalling and lighting devices and extract them from the casing of the device as needed without the risk of losing any of them and without the risk of finding himself without even one of said elements. In other words, the user can carry the device provided with all its components inside the casing and decide to take out and put into operation only those which are needed at the time.

Obviously the uses described above are only indicative and not exhaustive: for example this device can be used for prams and pushchairs, i.e. the device can be attached to the frame portions, handlebar and the like which prams and buggies are usually equipped with.

A person skilled in the art may make numerous modifications and variations to the devices described above so as to satisfy contingent and specific requirements while remaining within the sphere of protection of the invention as defined by the following claims.

The invention claimed is:

1. A modular portable device for viewing, signalling and lighting, comprising:
   a casing realizing either a container body or a grip or attachment element of the modular portable device;
   at least one viewing device to reflect an image of surrounding environment to the modular portable device;
   at least one signalling device to emit a beam of light to signal presence of the modular portable device and/or of a user or vehicle supporting said modular portable device;
   at least one lighting device, to emit a beam of light to illuminate a surrounding environment;
   wherein said viewing device and signalling device are mechanically separable from one another and mechanically associable and removable to/from said casing independently;
   a multiple connector having an attachment element to the casing and a plurality of coupling elements for said viewing, signalling and lighting devices, said attachment elements detachably supporting said viewing, signalling and lighting devices;
   wherein the attachment elements of the multiple connector comprise cylindrical geometry protuberances providing a detachable mechanical coupling with relative counter-shaped seats of the removable attachment means of said viewing, signalling and lighting devices.

2. The modular portable device according to claim 1, wherein the viewing and signalling devices comprise removable attachment means of the viewing and signalling devices to the casing compatible with each other, wherein the viewing and signalling devices are interchangeable with each other.

3. The modular portable device according to claim 2, wherein the lighting device comprises removable attachment means of the viewing, signalling and lighting devices to the casing compatible with each other, wherein the viewing, signalling and lighting devices are interchangeable with each other.

4. The modular portable device according to claim 1, wherein the casing is a hollow body which delimits a cavity at least partially counter-shaped relative to said viewing, signalling and/or lighting devices, which are at least partially housed inside the cavity of said casing, when not in use.

5. The modular portable device according to claim 4, wherein the cavity of the casing has a cylindrical shape with respect to a main extension axis.

6. The modular portable device according to claim 1, wherein the casing has a cylindrical shape with respect to a main extension axis.

7. The modular portable device according to claim 1, wherein the attachment element to the casing of the multiple connector has a cylindrical geometry around said main extension axis.

8. The modular portable device according to claim 1, wherein the coupling elements are shaped to form a shaped coupling with the removable attachment means of the viewing, signalling and lighting devices.

9. A modular portable device for viewing, signalling and lighting, comprising:
- a casing realizing either a container body or a grip or attachment element of the modular portable device;
- at least one viewing device to reflect an image of surrounding environment to the modular portable device;
- at least one signalling device to emit a beam of light to signal presence of the modular portable device and/or of a user or vehicle supporting said modular portable device;
- at least one lighting device, to emit a beam of light to illuminate a surrounding environment;
- wherein said viewing device and signalling device are mechanically separable from one another and mechanically associable and removable to/from said casing independently;
- a multiple connector having an attachment element to the casing and a plurality of coupling elements for said viewing, signalling and lighting devices, said attachment elements detachably supporting said viewing, signalling and lighting devices;
- wherein the coupling elements comprise magnetic connection means which form a mechanical coupling with the removable attachment means of the viewing, signalling and lighting devices.

10. The modular portable device according to claim 1, wherein the multiple connector comprises power supply means contained inside said multiple connector and the multiple connector comprises at least one electrical output terminal to couple with a corresponding electrical input terminal attached to at least one out of the signalling devices and the lighting devices to permit power supply.

11. The modular portable device according to claim 1, wherein the viewing device comprises a mirror.

12. The modular portable device according to claim 11, wherein said mirror comprises a rotation joint to orient said mirror.

13. The modular portable device according to claim 12, where said rotation joint is a ball joint allowing rotation of the mirror both in a lateral direction, and in a vertical direction.

14. The modular portable device according to claim 11, wherein the viewing device comprises a lid folding with said mirror.

15. The modular portable device according to claim 1, wherein the lighting device comprises at least one lamp.

16. The modular portable device according to claim 1, where the signalling device comprises at least one reflector and/or a lamp.

17. The modular portable device according to claim 15, wherein the signalling device and/or the lighting device comprise power supply means contained inside said devices to power the respective lamps.

18. The modular portable device according to claim 1, wherein the viewing, signalling and lighting devices are provided with rotation joints to rotate said viewing, signalling and lighting devices independently of one another, at least in a lateral direction, and in a vertical direction.

19. The modular portable device according to claim 18, wherein said rotation joints are integrated in respective removable attachment means of the viewing, signalling and lighting devices.

* * * * *